United States Patent [19]
Miller et al.

[11] Patent Number: 4,938,558
[45] Date of Patent: Jul. 3, 1990

[54] FUSED CONNECTOR FOR OPTICAL FIBER

[75] Inventors: Nancy L. Miller, Harrisburg; Larry R. Stauffer, Camp Hill, both of Pa.

[73] Assignee: AMP Incorporated, Harrisburg, Pa.

[21] Appl. No.: 332,818

[22] Filed: Apr. 3, 1989

Related U.S. Application Information

[63] Continuation-in-part Ser. No. 321,023 March 9, 1989, Pat. No. 4,911,578

[51] Int. Cl.⁵ .............................................. G02B 6/36
[52] U.S. Cl. ............................... 350/96.20; 350/96.21; 350/96.23
[58] Field of Search ................. 350/96.20, 96.21, 96.23

[56] References Cited

U.S. PATENT DOCUMENTS

| | | | |
|---|---|---|---|
| 4,087,158 | 5/1978 | Lewis et al. | 350/96.21 |
| 4,107,242 | 8/1978 | Runge | 350/96.20 X |
| 4,225,214 | 9/1980 | Hodge et al. | 350/96.21 |
| 4,264,128 | 4/1981 | Young | 350/96.20 |
| 4,362,356 | 12/1982 | Williams et al. | 350/96.20 |
| 4,424,174 | 1/1984 | Howarth | 350/96.21 |
| 4,440,469 | 4/1984 | Schumacher | 350/96.20 |
| 4,479,910 | 10/1984 | Kurohawa et al. | 264/2.5 |
| 4,487,474 | 12/1984 | Nishie et al. | 350/96.21 |
| 4,512,630 | 4/1985 | Runge | 350/96.20 X |
| 4,681,398 | 7/1987 | Bailey et al. | 350/96.21 X |
| 4,687,291 | 8/1987 | Stane et al. | 350/96.21 |
| 4,691,986 | 9/1987 | Aberson, Jr. et al. | 350/96.21 |
| 4,714,317 | 12/1987 | Szentesi | 350/96.21 |
| 4,721,357 | 1/1988 | Kovalchick et al. | 350/96.21 |
| 4,722,584 | 2/1988 | Kakii et al. | 350/96.20 |
| 4,738,055 | 4/1988 | Jackson et al. | 51/281 R |
| 4,741,590 | 5/1988 | Caron | 350/96.21 |
| 4,747,658 | 5/1988 | Borsuk et al. | 350/96.20 |
| 4,773,725 | 9/1988 | Ashman et al. | 350/96.20 |
| 4,795,231 | 1/1989 | Tanabe | 350/96.21 |
| 4,805,980 | 2/1989 | Machenroth | 350/96.21 |
| 4,826,276 | 5/1989 | Abbott et al. | 350/96.20 |
| 4,826,277 | 5/1989 | Weber et al. | 350/96.23 |
| 4,911,518 | 2/1990 | Miller | 350/96.20 |

Primary Examiner—John D. Lee
Assistant Examiner—Phan T. Heartney
Attorney, Agent, or Firm—Gerald K. Kita

[57] ABSTRACT

A connector 1 for an optical fiber 2 comprising; an alignment ferrule 9 for encircling an optical fiber 2, a precision alignment surface 23 of the ferrule constructed for nonreformation upon alignment in a cavity having a shape complementary to that of the precision alignment surface 23, the precision alignment surface 23 is constructed on a front end portion 10 of said ferrule, said first portion is constructed from assembly with a separate remainder of said ferrule in a manner to isolate said precision alignment surface 23 from distortion.

7 Claims, 3 Drawing Sheets

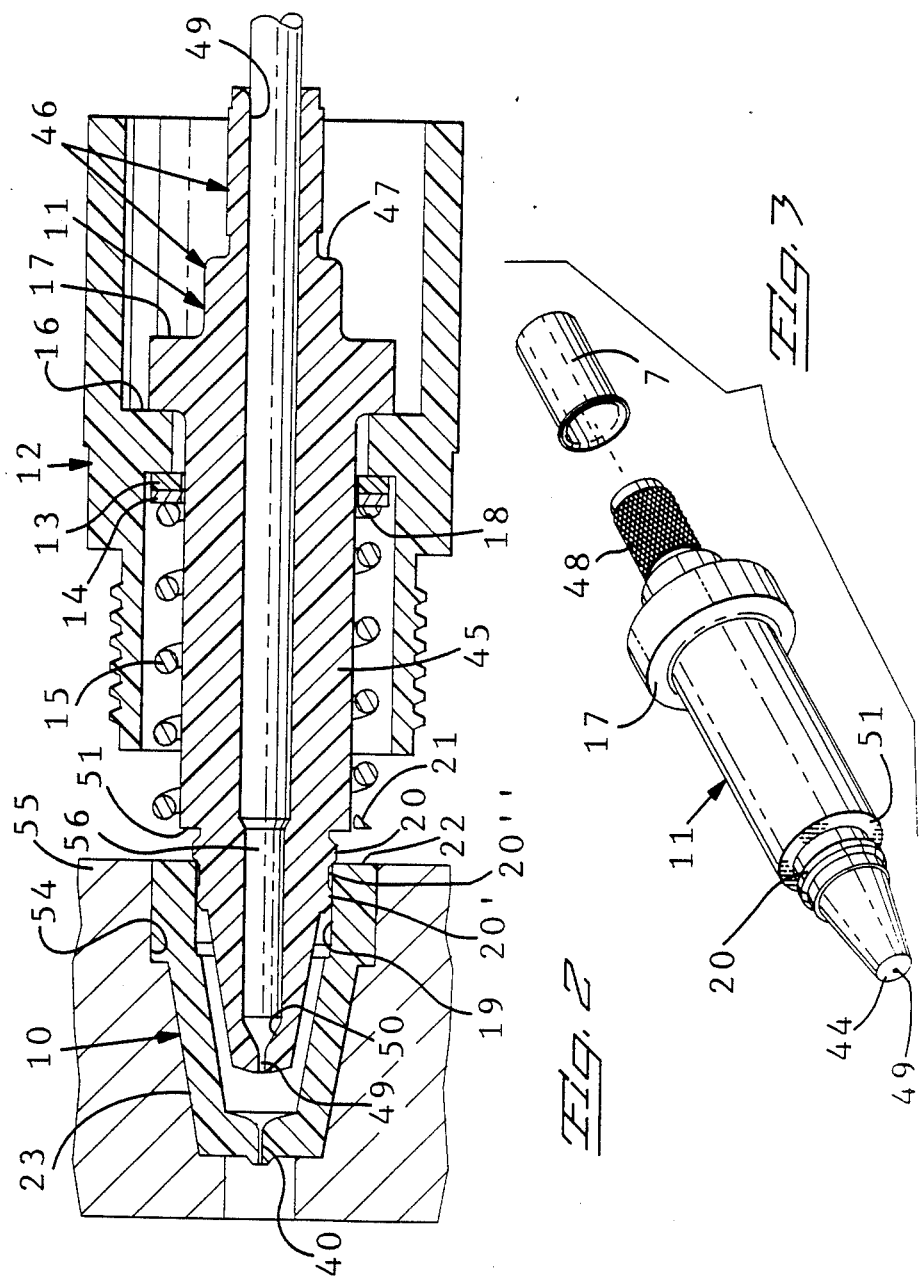

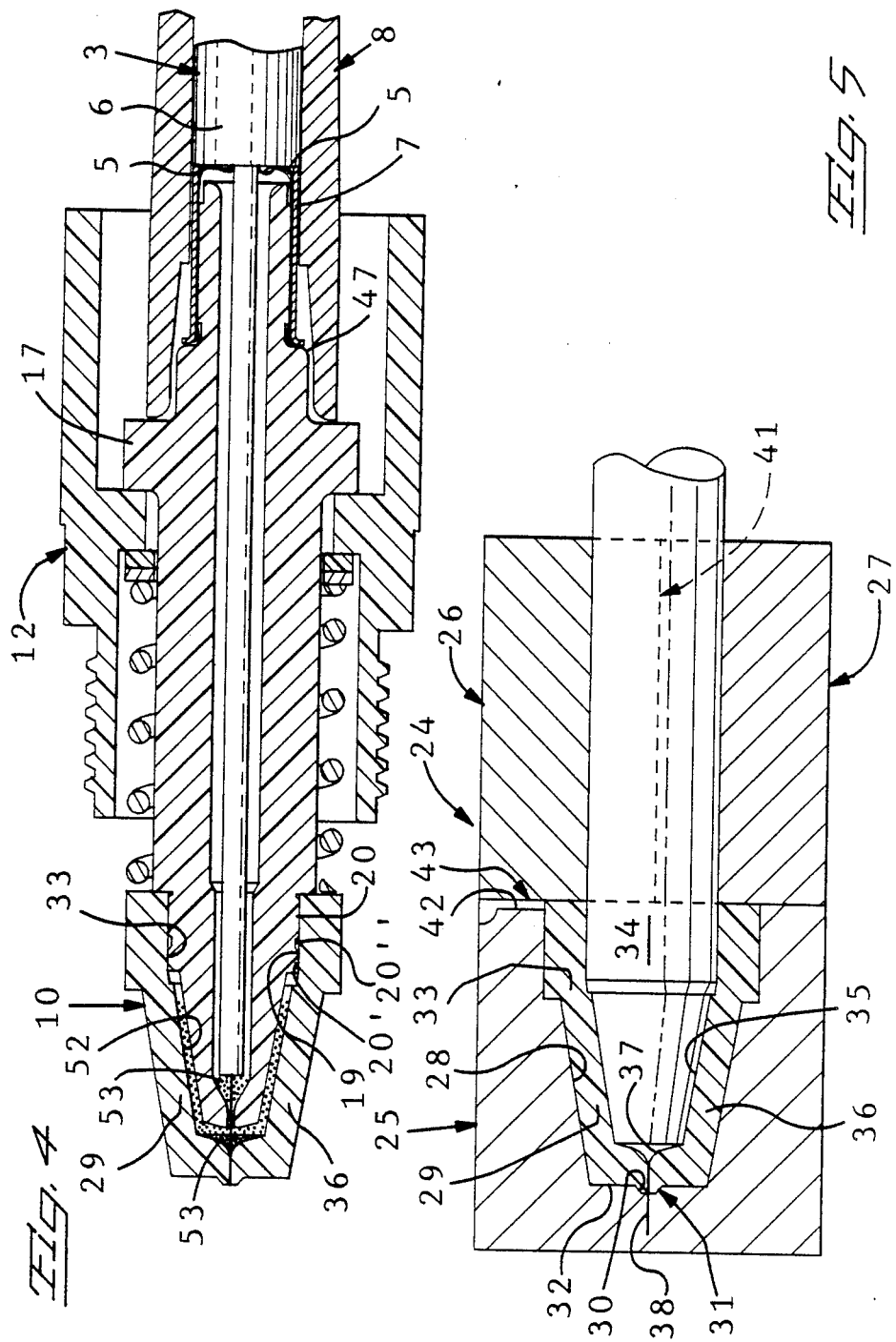

FUSED CONNECTOR FOR OPTICAL FIBER

CROSS REFERENCE TO RELATED APPLICATION

This application is a continuation in part of application Ser. No. 321,023, filed Mar. 9, 1989.

Field of the Invention

The invention pertains to a connector for an optical fiber. A front end of the connector is a precision alignment surface constructed for alignment within a complimentary shaped cavity of an alignment sleeve or bushing to align the optical fiber along the alignment sleeve or bushing.

Background of the Invention

A known connector for an optical fiber is disclosed in U.S. Pat. No. 4,512,630. This known connector includes an alignment ferrule for encircling an optical fiber. The alignment ferrule has a unitary front end with a conical frustrum shape adapted for aligning an end of the fiber within a complimentary conical cavity of an alignment sleeve. To achieve accurate alignment, precise symmetry of the conical cavity and of the frustrum of the alignment ferrule are required. Symmetry has been achieved heretofore by first forming the conical surface of the cavity to an intermediate shape, followed by abrading the surface to a final shape according to the disclosure of U.S. Pat. No. 4,738,055. The alignment ferrule is first formed to a preliminary shape and then is ground to form a precise frustrum surface on the front end of the alignment ferrule, according to a process disclosed in U.S. Pat. No. 4,721,357.

Because these processes are costly, it is desirable to eliminate them. A previous attempt has been made to form a precisely defined alignment surface on an alignment ferrule without grinding. For example, according to U.S. Pat. No. 4,264,128, fluent material is molded over a rigid insert that partitions the mold and directs the flow of the material to provide precisely defined alignment surfaces.

Summary of the Invention

An objective of the invention is to form a precisely defined alignment surface on an alignment ferrule without grinding. A further objective is to form a precisely defined alignment surface on an alignment ferrule without an imbedded insert to direct the flow of fluent molding material. A feature of the invention is directed to a separate portion of the ferrule constructed with a simple volumetric shape and a precisely defined alignment surface. The separate portion is assembled to a remainder of the alignment ferrule. Precise definition of the alignment surface is attained without grinding, because the separate portion is capable of being formed or otherwise constructed with a simple volumetric shape free from the intricacy and complexity associated with the remainder of the ferrule.

In addition, the separate portion is formed by molding a precision alignment surface of uniform and carefully controlled dimensions over an underlying wall having a uniform thickness extending all along the precision alignment surface. The uniform thickness promotes formation of the uniform and carefully controlled dimensions.

Another feature of the invention resides in molding a precision alignment surface of an alignment ferrule along a separate front portion of shorter axial dimension than the axial dimension of a separate, longer remainder portion of an alignment ferrule. The shorter axial dimension is formed by corresponding short mold core pin that is easier to align in a corresponding mold than a longer core pin that is used to fabricate the remainder of the alignment ferrule.

According to another feature of the invention, a connector for an optical fiber comprises; an alignment ferrule for encircling an optical fiber, a precision alignment surface of the ferrule constructed for nonreformation upon alignment in a cavity having a shape complementary to that of the precision alignment surface.

A first portion of said ferrule is constructed on a front end portion of said ferrule together with said precision alignment surface, and said first portion is constructed for assembly with a second separate portion of said ferrule, and said first portion is spaced from said precision alignment surface to isolate said precision alignment surface from distortion when said first portion is assembled with said separate second portion of said ferrule.

According to U.S. Pat. No. 4,440,469 it is known to assemble a nose portion on an alignment ferrule. The nose portion is fabricated of a resiliently compressible material. The nose portion radially compresses in the confines of the alignment bushing, and thereby becomes aligned along the axis of the bushing. Alignment in the bushing is accomplished by reforming the preliminary shape of the radially compressed material of the alignment ferrule, when the ferrule is compressed in the confines of the alignment bushing.

According to a feature of the invention, alignment of a ferrule is accomplished by a precise geometry of an alignment ferrule in an adjacent sleeve of precise geometry. This alignment technique is recognized as a standard in Publication ZZZ: Sectional Specification For Fiber Optic Connector -Type BAM, of the International Electrotechnical Commission, Technical Committee Number 86 Fibre Optic Interconnecting Devices and Passive Components. According to the invention, reforming the shape of a precisely dimensional, symmetrical alignment ferrule is undesired. Reforming the shape of such an alignment surface would cause distorted alignment of such a surface in a symmetrical cavity. Thus, a feature of the invention resides in alignment of a nonreformed a shape of a precisely symmetrical alignment ferrule against a symmetrical cavity.

These and other advantages, features and objects of the invention are disclosed by way of example from the following detailed description and accompanying drawings.

Description of the Drawings

FIG. 2 is an enlarged longitudinal section view of the connector as shown in FIG. 1.

FIG. 3 is an enlarged perspective view of a portion of an alignment ferrule and the crimp ferrule.

FIG. 4 is an enlarged longitudinal section view of the connector assembled with the optical cable, the crimp ferrule and the strain relief boot.

FIG. 5 is a longitudinal section view through mold dies and through a front end portion of an alignment ferrule of the connector shown in FIG. 1.

With reference to FIG. 1 a connector 1 for an optical fiber 2 of an optical fiber cable 3. The cable 3 is of known construction and includes a flexible buffer 4 concentrically encircling the fiber 2, multiple strands of strength members 5 extending axially of the buffer 4 and distributed around the periphery of the buffer 4, and an external jacket 6. The connector 1 is constructed for further assembly with a hollow, cylindrical, metal crimp ferrule 7 and an elongated, tubular, strain relief boot 8.

With reference to FIGS. 1 and 2 of the drawings, the connector 1 includes an elongated alignment ferrule 9 having a front end portion 10 and a second portion 11. The second portion 11 is encircled by, a coupling nut 12, a low friction, first washer 13 of low friction material, for example, polytetrafluoroethylene, a second, metal washer 14, and a coil spring 15. An internal radial inward flange 16 of the coupling nut 12 projects radially inward toward the second portion 11 of the alignment ferrule 9 and engages an external and radially outward projecting, unitary flange 17 of the second portion 11. A rear end 18 of the spring 15 engages the metal washer 14. The front end portion 10 is assembled by coupling means, for example, an internal cylindrical surface 19 joined to a corresponding external ring 20 of the second portion 11. A front end 21 of the coil spring 15 engages a rear end 22 of the front end portion 10. The coil spring 15 is in moderate compression between the rear end 22 and the flange 16 of the coupling nut 12, as the front end portion 10 is threadably advanced along the ring 20 of the second portion 11 of the alignment ferrule 9. Advantageously, the above described parts are assembled without another part or a fixture being required to compress the spring 15 while the front end portion 10 is being assembled.

Figure 1:
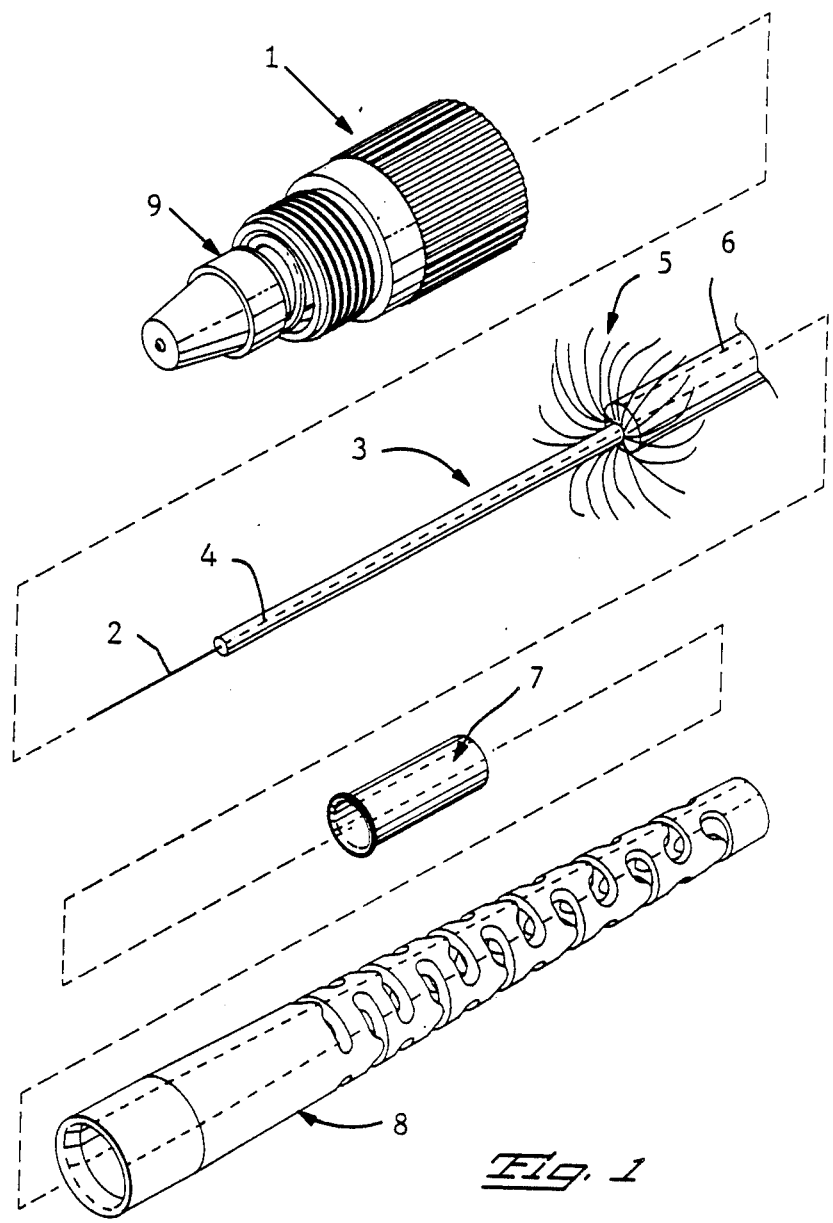
FIG. 1 is a fragmentary perspective view of a connector, an optical cable, a crimp ferrule and a strain relief boot.

According to known practice, the coupling nut 12 of the connector 1 is assembled by hand onto an alignment means comprising a threaded sleeve or bushing, as disclosed in U.S. Pat. No. 4,512,630, to provide a threaded and disengageable coupling of the alignment ferrule 9 and the bushing. During assembly, the coupling nut 12 is rotatable with respect to the ferrule 9 and is slidable along the ferrule 9 to compress the coil spring 15. A precise alignment of the ferrule 9 in the bushing is desired. The ferrule 9 has a precision alignment surface 23 of the type constructed for nonreformation to a different shape when engaged against a complementary shaped cavity of the bushing, as disclosed in U.S. Pat. No. 4,512,630. Construction of the precision alignment surface 23 heretofore was accomplished by grinding the alignment ferrule 9, as disclosed in U.S. Pat. No. 4,721,357. The following description includes a precision alignment surface 23 constructed without grinding. The precision alignment surface 23 described below is always suitably shaped for precise alignment against the complementary shape of the cavity of the bushing, and does not require reformation to a different shape to accomplish the desired alignment.

With reference to FIG. 5, the front end portion 10 is fabricated of plastic material in a mold 24 having a first mold die 25, a second mold die 26 and a third mold die 27. The first mold die 25 has a cavity portion 28 shaped for receiving the plastic material and forming, on a first section 29 of the front end portion 10, the precision alignment surface 23 to a final shape, for example, a frustrum conical shape. A front end 30 of the cavity portion 28 is recessed to form an integral, lump projection 31 extending axially and forward of a front end face 32 of the first section 29. The cavity portion 28 is shaped also for forming a unitary, enlarged, cylindrical second section 33 spaced axially to the rear of the precision alignment surface 23 on the first section 29.

A mold core pin 34 extends axially of the cavity portion 28 and has an external shape that forms an interior surface 35 of the front end portion 10, and that forms the front end portion 10 with an underlying wall 36 of uniform wall thickness all along the full circumferential extent of the precision alignment surface 23, and between the precision alignment surface 23 and the interior surface 35. The uniform thickness promotes formation of the uniform surface 23 and the carefully controlled dimensions. Further, the front end portion 10 is fabricated with a single volumetric shape.

The core pin 34 is shaped to form a curved funnel 37 recessed in the interior surface 35 toward the face 32 of the front end portion 10. The core pin 34 has a small diameter portion 38 extending through the face 32 of the front end portion 10 to form a small diameter axial passage 40 through the face 32 and centrally through the projection 31 and concentric with the precision alignment Surface 23. The second mold die 26 and the third mold die 27 move toward and abut each other along a parting line 41 and close about the core pin 34.

The plastic material in a fluent state is introduced along a mold gate 42, which is a passage communicating with the cavity portion 28. The second mold die 26 and the third mold die 27 are against the first mold die 25 along another parting line 43 to form the rear end 22 of the front end portion 10. The fluent plastic material fills the cavity portion 28 and is solidified in the cavity portion 28 to form the front end portion 10, while the core pin 34 forms the interior surface 35 and the axially extending passage 40. The mold dies 25, 26, 27 separate from one other along the corresponding parting lines 41, 43. Thereby the core pin 34 is free to be withdrawn axially from the first mold die 25, and the molded front end portion 10 may be ejected from the mold 24.

With reference to FIG. 3, the second portion 11 has been fabricated by a mold, not shown, according to a process as described in conjunction with the mold 24. The second portion 11 includes a conical frustrum front end 44 that is axially aligned with and unitary with an elongated cylindrical portion 45, in turn, axially aligned with and unitary with the enlarged diameter flange 17. The second portion 11 includes a unitary rear end portion 46 of stepped diameter, providing a radially extending shoulder 47.

An exterior of the rear end portion 46 is roughened by molding a textured rough surface 48. As shown in FIGS. 3 and 4, an axial passage 49 extends entirely along the second portion 11, and has a funnel 50 tapered toward and communicating with the front end 44. During molding, the external ring 20 on the cylindrical portion 45 is formed together with an external, radially extending shoulder 51 facing forwardly.

The ring 20 is dimensioned for an interference fit with the cylindrical surface 19 of the front end portion 10. The ring 20 is rigid initially. To force the cylindrical surface 20 onto the ring 20 when the ring 20 is rigid, would cause undesired distortion of the front end portion 10. As disclosed in FIG. 2, the front end portion 10 is held in a complementary shaped cavity 54 of a holding fixture 55. The rear end 22 is held in engagement against the ring 20. An ultrasonic horn 56 is fitted along the passage 49 concentric with the ring 20 and vibrates the second portion 11 at ultrasonic frequency, for example, 20,000 KHertz. The ring 20 is a portion of the second portion 11 and is caused to vibrate at ultrasonic frequency while engaged against the rear end 22.

The ring 20 is an ultrasonic energy concentrator and produces heat by friction when vibrated in contact with the rear end 22. The heat causes the ring 20 to soften and melt, where contacting the front end portion 10, and while being subjected to ultrasonic energy. The interference fit of the ring 20 and the surface 19 is partially reduced or partially relieved when the ring 20 is softened, allowing the front end portion 10 to assemble slidably over the ring 20, without distorting the shape of the front end portion 10. The front end portion 10 has been moved to its fully assembled position engaging the shoulder 51, as shown in FIG. 4, thereby fixing the front end portion 10 with respect to the second portion 11, and providing a clearance 52 between the wall 36 along the precision alignment surface 23 and the second portion 11.

The softened portion of the ring 20 is melted and forms a fusable material that, when solidified, fuses to the surface 19 and joins the front end portion 10 to the second portion 11.

An alignment collar 20' of ring shape is forward of the ring 20 on the second portion 11. The collar 20' is dimensioned with a sliding fit against the surface 19 and retains the front end portion 10 concentric while the front end portion 10 is assembled slidably onto the ring 20 and becomes fused with the ring 20. Fusable material is permitted to flow into a circular clearance 20'' between the ring 20 and the collar 20'.

The second portion 11 projects forwardly of the ring 20, and faces the interior surface 35 without exerting pressure on the interior surface 35. The presence of pressure would tend to cause undesired distortion of the thin wall 36 and the precision alignment surface 23. Because the first section 29 is separate from the surface 19 on the second section 33, the precision alignment surface 23 on the first section 29 is separated from a coupling formed by the interengaged surface 19 and ring 20, and from stress transferred across the coupling, during assembly of the front end portion 10 and during use. For example, the ring 20 is 0.198 inches in external diameter, and there is a 0.015 inch interference fit with the surface 19 prior to softening of the ring 20.

The front end portion 10 has a shorter axial dimension than that of the second portion 11. The shorter axial dimension promotes accurate alignment of the corresponding shorter mold core pin 34 that is easier to align in a corresponding mold 24 than to align a longer core pin in a corresponding mold, not shown.

The connector 1 and the associated crimp ferrule 7 and strain relief boot 8 are delivered to a customer as shown in FIGS. 1 and 2. The customer assembles the connector 1 to the optical cable 3 shown in FIG. 1. With reference to FIG. 3, the connector 1 is assembled by assembling the optical cable 3 successively through the strain relief boot 8 and through the crimp ferrule 7. The buffer covered fiber 2 is assembled into and along the passage 49 from a rear of the passage 49. The funnel 50 of the passage 49 is axially aligned with and spaced by a clearance from the funnel 37 of the passage 40. The funnels 50, 37 guide the optical fiber 2 of the cable 3 from the second portion 11 and into the passage 40 of the front end portion 10. The optical fiber 2 projects through the projection 31 and is positioned for being polished flush with the projection 31. Polishing may be accomplished by any known manner.

According to FIG. 4, a quantity of adhesive 53, for example epoxy, may be applied to the passage 49 prior to the introduction of the buffer covered fiber 2. A hypodermic syringe, not shown, is used to inject the adhesive 53 deeply into the passage 49 adjacent to the front end 44. Such use of a hypodermic syringe is disclosed in U.S. Pat. application 159,151, filed Feb. 23, 1988. The adhesive 53 is injected until a quantity of the adhesive 53 emerges from the passage 49 and is deposited in the clearance 52. The adhesive 53 bridges the clearance 52, and upon solidification, forms a joint that bonds together the front end portion 10 and the second portion 11 into a unitary structure. The unitary structure avoids potential breaking of the optical fiber 2, by preventing movement of the front end portion 10 relative to the remainder of the alignment ferrule 9. Further, the unitary structure is provided of disparate parts comprising, the front end portion 10 having a precise overall geometry, and the remainder of the alignment ferrule 9 having a less precise geometry. The adhesive forms a joint without compression against the front end portion 10, leaving the front end portion free of consequent distortion when the joint is formed. The adhesive 53 will coat and adhere the optical fiber 2 and the buffer 4 and will adhere to walls of the passages 40, 49 to secure the optical fiber 2 and the buffer 4 in the passages 40,49. The strength members 5 are clamped between the rear end portion 46 of the alignment ferrule 9 and the crimp ferrule 7 which has been moved axially along the cable 3 to forward position, removed from the cable jacket 6, engaged against the shoulder 47 and encircling the rear end portion 46. The knurling 48 provides increased friction to retain the crimp ferrule 7 in place. The strain relief boot 8 is moved axially along the cable 3 until the boot 8 encircles and frictionally engages the crimp ferrule 7 and an adjacent end of the jacket 6.

The invention has each of the previously discussed advantages and features. Each of the advantages or features exists independently of the others, and each contributes to the use and importance of the invention with or without the presence of the others.

We claim:

1. A method for assembling an optical connector for an optical fiber comprising the steps of:

fabricating a front end portion of an alignment ferrule with a precision alignment surface and a coupling portion, fabricating separately from the front end portion a remainder portion of said alignment ferrule with a thermoplastic portion for joining to said coupling portion, applying energy to soften and melt said thermoplastic portion, engaging said thermoplastic portion in a melted condition against said coupling portion in the absence of an optical fiber assembled along said front end portion, and solidifying said thermoplastic portion while engaged with said coupling portion to join with said coupling portion in the absence of an optical fiber assembled along said front end portion and without distorting said precision alignment surface, whereby the front end portion and the remainder portion of said alignment ferrule are joined together before assembly of an optical fiber therewith.

2. A method as recited in claim 1, wherein said thermoplastic portion is an ultrasonic energy concentrator, and wherein the step of applying energy further includes the step of, applying ultrasonic energy to soften and melt said thermoplastic portion.

3. A method as recited in claim 1 and further including the steps of;
    assembling said coupling portion with an interference fit with said thermoplastic portion in a softened condition.

4. A connector for an optical fiber, comprising, a first, front end portion of an alignment ferrule and a remainder portion of an alignment ferrule fabricated according to the method recited in claim 1, and wherein the improvement comprises;
    an energy concentrator between said first portion and said remainder portion and fusably joining said first portion and said remainder portion.

5. A connector as recited in claim 4 wherein the improvement comprises;
    a portion of said remainder portion has been dimensioned for an interference fit with said first portion, and
    said interference fit has been relieved by said portion of said remainder portion being softened.

6. A connector as recited in claim 4 wherein the improvement comprises;
    said first portion includes a cylindrical surface, and
    said remainder portion includes a projecting ring engaging said cylindrical surface and forming.

7. A method for assembling an optical connector as recited in claim 1, comprising the further step of;
    providing an optical face on an optical fiber assembled along said front end portion without removing the entirety of said front end portion from said remainder portion of said alignment ferrule.

* * * * *

UNITED STATES PATENT OFFICE
CERTIFICATE OF CORRECTION

Patent No. 4,938,558          Dated  July 3, 1990

Inventor(s)  Nancy L. Miller, Larry R. Stauffer

It is certified that error appears in the above-identified patent and that said Letters Patent is hereby corrected as shown below:

In claim 6, column 8, line 12, after the word "forming" add --said thermoplastic material--.

Signed and Sealed this

Tenth Day of December, 1991

Attest:

HARRY F. MANBECK, JR.

*Attesting Officer*          *Commissioner of Patents and Trademarks*